Patented Sept. 26, 1922.

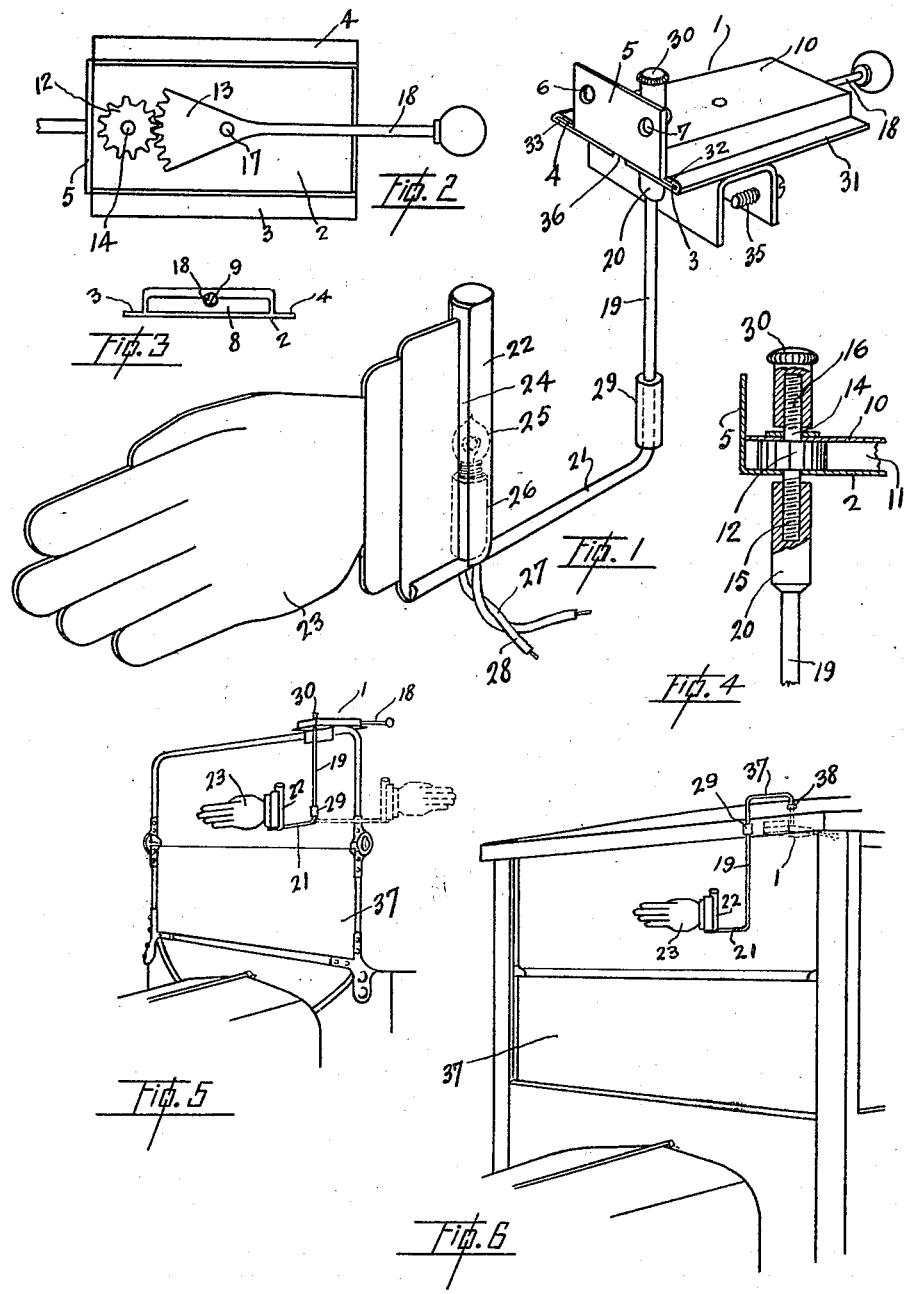

1,430,442

UNITED STATES PATENT OFFICE.

WILLIAM EDWARD FRANCIS GIBSON, OF VANCOUVER, BRITISH COLUMBIA, CANADA, ASSIGNOR OF ONE-HALF TO ANDREW JOHNSTON, OF VANCOUVER, CANADA.

AUTOMOBILE SIGNALING DEVICE.

Application filed March 11, 1922. Serial No. 542,932.

*To all whom it may concern:*

Be it known that I, WILLIAM EDWARD FRANCIS GIBSON, a citizen of the United States, residing at the city of Vancouver, in the Province of British Columbia, Canada, have invented certain new and useful Improvements in Automobile Signaling Devices, of which the following is a specification.

My invention relates to improvements in automobile signaling devices and the object of my invention is to provide a simple and inexpensive device which can be readily and easily applied to an automobile for manipulation by the driver to indicate the direction of travel of the car, either straight ahead or to the right or left, as the case may be, or at intersections, bends, or turns in streets or highways, thereby enabling observers to determine the course of the car and thus avoiding accident.

I attain this object by the construction illustrated in the accompanying drawings in which—

Fig. 1 is a perspective view of my device.

Fig. 2 is a plan view of the operating mechanism.

Fig. 3 is a view of the slotted end of the box.

Fig. 4 is a sectional detail view of the pinion shaft.

Fig. 5 is a view illustrating the application of the device to an open automobile.

Fig. 6 is a view illustrating its application to a closed vehicle.

Similar figures of reference indicate similar parts throughout the several views.

The device consists of a box, indicated generally by the numeral 1, the bottom plate 2 of which is extended to form side flanges 3 and 4 while at its front end the box is provided with an apertured vertical flange 5, the apertures being indicated by the numerals 6 and 7. The rear end of the box is provided with a slot 8 the upper edge of which has a notch 9 formed in it at midlength, as shown in Fig. 3. The height of the cover plate 10 of the box above the bottom plate is sufficient to provide a space 11 within which is housed a pinion 12 and a toothed sector 13 which meshes with the pinion, as shown in Fig. 2. The pinion is secured to a vertical threaded shaft 14 which extends freely through the bottom plate 2 and the cover plate 10 so that threaded extensions 15 and 16 are provided exteriorly of the box and thus the pinion 12 is rotatably mounted, while the sector 13 is pivoted on a pivot 17 and is provided with an extension rod 18 projecting beyond the end of the box through the slot 8, being normally seated in the notch 9, so that it is held centrally against inadvertent movement.

19 indicates a rod provided at one end with a socket 20 threaded internally to correspond to the threaded extension 15, the opposite end of which rod is bent at right angles to form an arm 21 adjacent the outer end of which is secured a vertical tubular member 22 from which extends forwardly a hand 23. This member is slotted on its forward side as at 24, and is provided in its interior with an incandescent bulb 25 and socket 26 connected to a suitable circuit, the wires of which are partly shown and indicated by the numerals 27 and 28 so that when the light is switched on it is projected through the slot 24 and illuminates the hand. 29 indicates a rubber sleeve mounted on the rod 19 to contact with the windshield glass when in place to prevent bumping or rattling of the device, while 30 indicates a cap threaded on the extension 16 to protect the same from the weather and damage to the thread when out of use.

In order to mount the device in operative position a plate 31 is provided the longitudinal edges of which are doubled over to form grooves 32 and 33 in which the flanges 3 and 4 of the box are slidable to the underside of which plate is secured a clamp 34 having clamping screws, indicated by the numeral 35. The front edge of the plate is notched, as at 36, to provide for passing over shaft 14.

In use with an open automobile the box 1 and plate 31 are assembled together and the clamp 34 is placed over the upper edge of the windshield 37, being tightened in position by the screws 35, the rod 19 being secured to the lower extension 15 of the pinion shaft 14 so that the arm 21 and hand 23 point forwardly, being held in that position by the engagement of the sector-operating arm 18 in the notch 9. In this position the hand indicates that the vehicle is travelling in a straight ahead direction. When it is desired to indicate turning to the left the driver grips the arm 18 and, depressing it out of the notch 9, moves it to the left to the end of the slot 8, thus partially rotating the pinion 12 and the shaft 14 and swinging the arm 21 and hand 23 to the left, as indicated by the dotted lines in Fig. 5, the arm 21 being, of course, of sufficient length to project the hand beyond the car. A return movement of the arm 18 to seat it again in the notch 9 returns the hand to its normal straight ahead position while by moving the arm 18 to the right the hand is swung to the right to indicate a turning movement of the vehicle in that direction.

A slight modification is made when the device is used with closed vehicles, as indicated in Fig. 6. In this case the box is secured in place by means of screws passed through the apertures 6 and 7 of the flange 5 and the cap 30 is removed from the upper threaded extension 16 of the pinion shaft 14. The upper end of the rod 19 is bent as at 37 so that when secured to the extension 16 it may pass first upwardly through a small aperture 38 in the roof of the vehicle, then forwardly to clear the edge of the roof, and then downwardly into the position shown in Fig. 5 with reference to the open vehicle, its operation being the same as already described.

From the foregoing it will be seen that I have provided a simple, practical, and inexpensive signaling device for use on automobiles and other moving vehicles.

What I claim as my invention is:

1. An automobile signaling device comprising a vertical rod provided on its upper end with a pinion and bent at right angles at its opposite end to form a direction indicating member, a toothed sector meshing with said pinion having an operating rod connected to it, and a plate carrying said pinion and sector provided with a clamp member.

2. An automobile signaling device comprising a vertical rod provided on its upper end with a pinion and bent at its opposite end to form a right angled extension, a direction indicating device mounted on the end of said extension, a toothed sector meshing with said pinion having an operating rod connected to it, and a plate carrying said pinion and sector provided with a clamp member.

3. An automobile signaling device comprising a vertical rod provided on its upper end with a pinion and bent at its opposite end to form an extension, a vertical tubular member slotted in its front wall mounted adjacent the end of said extension, a direction indicating device projecting from said slot, a toothed sector meshing with said pinion having an operating rod connected to it, and means for mounting said vertical rod on the automobile windshield.

4. An automobile signaling device comprising a box having a slot in one end notched at midlength of one edge a pinion mounted within the box adjacent the opposite end, a shaft secured to said pinion having its opposite ends threaded and extending rotatably through the top and bottom of the box, a toothed sector pivoted within the box meshing with the said pinion and having an operating rod connected to it extending through the said end slot and normally seated in the notch thereof, a rod provided at its upper end with a threaded socket adapted to fit either of the pinion shaft extensions, said rod being bent at right angles at its opposite end and extended and provided with an indicating device at the extremity of the extension.

5. An automobile signaling device comprising a box having a slot in one end notched at midlength of one edge, a pinion mounted within the box adjacent its opposite end, a shaft secured to said pinion having its opposite ends threaded and extending rotatably through the top and bottom of the box, a toothed sector pivoted within the box meshing with the said pinion and having an operating rod connected to it extending through the said end slot and normally seated in the notch thereof, a rod provided at its upper end with a threaded socket adapted to fit either of the pinion shaft extensions, said rod being bent at right angles at its opposite end and extended and provided with an indicating device at the extremity of the extension, a plate on which said box is removably mounted, and a clamping device secured to the underside of the said plate.

6. An automobile signaling device comprising a box having a slot in one end notched at midlength of one edge, a pinion mounted within the box adjacent the opposite end, a shaft secured to said pinion having its opposite ends threaded and extending rotatably through the top and bottom of the box, a toothed sector pivoted within the box meshing with the said pinion and having an operating rod connected to it extending through the said end slot and normally seated in the notch thereof, a rod provided at its upper end with a threaded socket adapted to fit either of the pinion shaft extensions, said rod being bent at right angles at its opposite end to form an extension, a vertical tubular member slotted in its front wall mounted adjacent the end of said extension, a direction indicating device projecting from said wall slot, and a clamp member connected to the bottom of said box.

In testimony whereof I affix my signature at the city of Vancouver, B. C., this 28th day of February, 1922.

WILLIAM EDWARD FRANCIS GIBSON.